United States Patent
Hilgers

(10) Patent No.: US 9,058,549 B2
(45) Date of Patent: Jun. 16, 2015

(54) INTEGRATED CIRCUIT PROVIDING AN EXTERNAL SWITCHING FUNCTIONALITY

(75) Inventor: Achim Hilgers, Alsdorf (DE)

(73) Assignee: NXP B.V., Eindhoven (NL)

(*) Notice: Subject to any disclaimer, the term of this patent is extended or adjusted under 35 U.S.C. 154(b) by 2351 days.

(21) Appl. No.: 11/910,182

(22) PCT Filed: Mar. 22, 2006

(86) PCT No.: PCT/IB2006/050882
§ 371 (c)(1),
(2), (4) Date: Sep. 28, 2007

(87) PCT Pub. No.: WO2006/103599
PCT Pub. Date: Oct. 5, 2006

(65) Prior Publication Data
US 2008/0272893 A1     Nov. 6, 2008

(30) Foreign Application Priority Data
Mar. 30, 2005 (EP) ..................... 05102495

(51) Int. Cl.
G08B 13/14     (2006.01)
H04Q 5/22      (2006.01)
(Continued)

(52) U.S. Cl.
CPC ........ G06K 19/0723 (2013.01); G06K 19/0717 (2013.01)

(58) Field of Classification Search
CPC ............ G06K 19/0723; G06K 19/073; G06K 19/07758; G06K 2017/007; G06K 19/07; G06K 19/077; G06K 19/07769; G06K 7/0008; H01Q 1/22; H04B 1/006; H04B 1/44
USPC .............. 340/572.1, 572.4, 10.1, 10.5, 539.1, 340/825.69, 10.41, 69, 72; 235/435, 436; 324/537–555, 500, 763, 765; 702/117, 702/122; 714/46, 733; 455/41.1
See application file for complete search history.

(56) References Cited

U.S. PATENT DOCUMENTS

| | | | | |
|---|---|---|---|---|
| 2,968,802 A | * | 1/1961 | Flory et al. | 340/516 |
| 4,857,893 A | * | 8/1989 | Carroll | 340/572.7 |
| 5,345,231 A | | 9/1994 | Koo et al. | |
| 5,537,105 A | * | 7/1996 | Marsh et al. | 340/10.32 |
| 5,696,363 A | | 12/1997 | Larchevesque | |
| 5,801,372 A | * | 9/1998 | Yamaguchi | 235/492 |
| 5,874,902 A | * | 2/1999 | Heinrich et al. | 340/10.51 |

(Continued)

FOREIGN PATENT DOCUMENTS

| | | |
|---|---|---|
| CN | 2624522 Y | 7/2004 |
| WO | 0045595 A1 | 8/2000 |

*Primary Examiner* — Daniel Wu
*Assistant Examiner* — Emily C Terrell

(57) ABSTRACT

The present invention relates to an integrated circuit (30) comprising a logic circuit (42) and reception means (34) for receiving external signals and for transmitting said received external signals to said logic circuit (42), and it relates to a device coupled to such an integrated circuit and to methods for manufacturing and operating such an integrated circuit and for transmitting control data to a device. In order to provide such an integrated circuit (30) for an extended functionality in comparison with conventional transponders, an integrated circuit (30) comprising a logic circuit (42); at least two external contacts (44a, 44b), switching means (46) connecting said logic circuit (42) to said external contacts (44a, 44b) and reception means (34) for receiving external signals and for transmitting said received external signals to said logic circuit (42) is proposed, wherein said integrated circuit (30) is operable in a first operation mode for providing a switching functionality—through said external contacts (44a, 44b) by said switching means (46) for switching an electrical connection between said external contacts (44a, 44b), wherein said switching means (46) are controlled by said logic circuit (42) in response to said received external signals. Further, a corresponding device coupled to such an integrated circuit (30) and corresponding methods for manufacturing and operating such an integrated circuit (30) and for transmitting control data to a device are proposed.

14 Claims, 4 Drawing Sheets

(51) Int. Cl.
  *G08B 1/08*   (2006.01)
  *G08B 1/00*   (2006.01)
  *G06K 7/00*   (2006.01)
  *G01R 31/02*  (2006.01)
  *H01H 31/02*  (2006.01)
  *G01R 31/00*  (2006.01)
  *G01R 27/28*  (2006.01)
  *G01R 31/14*  (2006.01)
  *G06F 11/00*  (2006.01)
  *G06K 19/07*  (2006.01)

(56) References Cited

U.S. PATENT DOCUMENTS

| | | | |
|---|---|---|---|
| 5,963,144 A * | 10/1999 | Kruest | 340/10.1 |
| 6,003,777 A | 12/1999 | Kowalski | |
| 6,559,754 B1 * | 5/2003 | Amtmann | 340/10.51 |
| 2003/0168515 A1 | 9/2003 | Gray | |
| 2004/0118912 A1 | 6/2004 | Cheng et al. | |
| 2004/0131897 A1 | 7/2004 | Jenson et al. | |

* cited by examiner

INTEGRATED CIRCUIT PROVIDING AN EXTERNAL SWITCHING FUNCTIONALITY

FIELD OF THE INVENTION

The present invention relates to an integrated circuit comprising a logic circuit and reception means for receiving external signals and for transmitting said received external signals to said logic circuit. The invention relates further to a device comprising such an integrated circuit and to methods of manufacturing and operating such an integrated circuit and for transmitting control data to a device.

BACKGROUND OF THE INVENTION

Integrated circuits having a logic circuit and reception means are known and are now used to an increasing extent in the form of so-called RFID (Radio Frequency Identification) transponders for identification purposes in the service sector or in the fields of logistics, trade or manufacturing. However, also systems utilizing lower frequencies (below 800 MHz) are used.

A transponder normally includes a semiconductor chip for storing data, which may be programmable and rewritable, and an antenna being adapted for the relevant frequency band (e.g. US-UHF: 902-928 MHz, Europe: 863-868 MHz, ISM: 2.4-2.483 GHz). A common RFID system comprises RFID transponders, reading devices having a system antenna providing a bi-directional (data) communication between the transponders and the reading devices.

In general, there is a distinction between active transponders and passive transponders. Active transponders are provided with an energy supply of their own while passive transponders receive the power necessary for operation from the high frequency signals, which are also used for communication.

US 2004/0131897 A1 discloses an RF transponder which combines the features of active and passive transponders. The transponder of US 2004/0131897 A1 comprises an electronic circuit, an RF antenna and a battery, wherein the electronic circuit is connected to the battery and thus receives energy from the battery upon reception of RF energy by the antenna which closes a switch between the electronic circuit and the battery and enables an electric connection between the battery and the electronic circuit.

The known transponder systems are limited in their purpose since the transponders only provide a functionality of identification and data communication between the transponders and the reading devices.

OBJECT AND SUMMARY OF THE INVENTION

It is a first object of the present invention to provide an integrated circuit as described in the opening paragraph, which allows for an extended functionality in comparison with conventional transponders. Further objects are the provision of a device comprising such an integrated circuit and of methods of manufacturing and operating such an integrated circuit and of a method of transmitting control data to a device.

The first object according to the present invention is achieved by an integrated circuit comprising a logic circuit, at least two external contacts, switching means connecting said logic circuit to said external contacts and reception means for receiving external signals and for transmitting said received external signals to said logic circuit, wherein said integrated circuit is operable in a first operation mode for providing a switching functionality through said external contacts by said switching means for switching an electrical connection between said external contacts, wherein said switching means are controlled by said logic circuit in response to said received external signals.

The invention is based on the insight that an integrated circuit exhibits an extended functionality when provided with external contacts which are controlled by the integrated circuit, i.e. the functionality of a conventional transponder and an additional control functionality for controlling other devices by controlling an electrical connection between said external contacts. Controlling an electrical connection, i.e. the opening and closing of an electrical connection between contacts, is a process which is located within the integrated circuit and which is part of the abilities of an integrated circuit. However, only if the contacts between which the electrical connection is controlled are external contacts, the opening and closing of the electrical connection may directly influence a device connected to said external contacts.

In a preferred embodiment of the present invention, the integrated circuit further comprises mode altering means for alternating between at least two operation modes of said integrated circuit, wherein a second operation mode is provided for performing a functionality test of said integrated circuit by means of said external contacts. A number of conventional transponders comprise contacts for connection of the transponder antenna and normally two additional contacts. The additional contacts are connected to the logic circuit of the chip and used for testing the functioning of the semiconductor chip of the transponder, in particular of the logic circuit. This testing is normally conducted on wafer level, i.e. before the separation of the dice. To provide a power supply the test contacts may also be connected to the antenna contacts. After separation of the dice, i.e. cutting the wafer, the test contacts may remain on the transponder chip but are not further used. By providing mode altering means and at least two operation modes of the integrated circuit, these test contacts may be used for testing in one operation mode and as said external contacts in another operation mode, which allows an improved utilization of the space of the wafer and of the integrated circuit.

In an advantageous embodiment of the present invention, said reception means are adapted for providing a power supply for said integrated circuit, utilizing energy from said external signals. The external signals are essential for the input of data into the integrated circuit. Since the switching means are controlled in response to said external signals, these signals may also be used as a power source.

The integrated circuit of another embodiment further comprises identification means including a substantially unique identifier, wherein said logic circuit controls said switching means in response only to received external signals which correspond to said unique identifier. When a number of integrated circuits are within the range of an emitter of said external contacts, and all these integrated circuits respond to the emitted signals irrespective of the possibility that the signals are directed to only one of them, this may lead to unintended confusion. Such confusion may be avoided if an integrated circuit observes only external signals which are directed to it, i.e. which correspond to an identifier identifying the integrated circuit.

Preferably, said reception means are adapted for receiving electro-magnetic signals, in particular radio frequency signals. Said integrated circuit including such reception means may form a transponder, in particular an RF-transponder, which exhibits an extended functionality and may nevertheless be incorporated into known communication systems, in particular RF communication systems.

In a further advantageous embodiment of the integrated circuit of the present invention, said logic circuit comprises coding means for controlling said switching means for a sequence of switching operations in order to generate a code signal. In addition to the rather simple task of switching, i.e. the change between an on- and an off-state, a sequence of switching operations forms a sequence of such changes between states and may thus be used to transmit data in the form of a binary code signal. It is to be understood that the term "sequence of switching operations" also includes the case of only one switching operation, i.e. the switching from one state to another state.

In addition, there is a broader meaning of the terms "switching" and "switching operations" in the present context, since there may be provided more states of electrical connection between said contacts than just the two on and off states. In yet a further embodiment, said switching means are controlled by said coding means to provide a change of the electrical resistance of the electrical connection between said external contacts between a low (or even very low) value (corresponding to a completely closed connection or on-state) and a high (or even infinite) value (corresponding to an open connection or off-state) in discrete steps or continuously. Further, voltages having different values and thus forming a code signal may be outputted upon control of said coding means, for example for addressing an external A/D-converter connected to said external contacts.

In yet another embodiment of the integrated circuit of the present invention, said logic circuit comprises input detection means for detecting an external electronic signal applied to said external contacts. The external contacts of this embodiment are used as an interface to and from the logic circuit. The external electronic signal applied to said external contacts may, for example, be used to re-program the logic circuit, to alter the above-mentioned unique identifier or for other data input into the integrated circuit. The applied electronic signal may be of any kind including a binary signal, i.e. a sequence of high and low signals, and analog signals like the ones provided by analog sensors, e.g. a temperature sensor, or by an external D/A-converter.

The object of the present invention is further achieved by a device coupled to an inventive integrated circuit, comprising function circuitry, wherein said function circuitry is connected to said external contacts of said integrated circuit, which controls said function circuitry by means of said switching means in said first operation mode.

The object of the present invention is moreover achieved by a method for operating an integrated circuit comprising a logic circuit, at least two external contacts, switching means connecting said logic circuit to said external contacts and reception means for receiving external signals and for transmitting said received external signals to said logic circuit, comprising the steps of:
 providing a first operation mode for providing a switching functionality through said external contacts by said switching means,
 receiving said external signals and transmitting said external signals to said logic circuit by means of said reception means, and
 controlling said switching means by said logic circuit in response to said received external signals.

Yet another solution of the object of the invention is a method for manufacturing an integrated circuit comprising a logic circuit, at least two external contacts, switching means connecting said logic circuit to said external contacts, reception means for receiving external signals and for transmitting said received external signals to said logic circuit and mode altering means for alternating between at least two operation modes of said integrated circuit, comprising the steps of:
 producing said integrated circuit being in a second operation mode,
 testing said logic circuit by means of said external contacts, and
 altering said integrated circuit to a first operation mode, wherein said logic circuit controls said switching means for providing a switching functionality through said external contacts in said first operation mode of said integrated circuit in response to said received external signals.

Finally, the object of the present invention is achieved by a method for transmitting control data to a device to be controlled, comprising the steps of:
 transmitting said control data as external signals to an integrated circuit comprising a logic circuit, at least two external contacts, reception means for receiving said external signals and for transmitting said received external signals to said logic circuit and switching means connecting said logic circuit to said external contacts, wherein said logic circuit controls said switching means for providing a switching functionality through said external contacts in at least one operation mode of said integrated circuit in response to said external signals, and wherein said device is connected to said external contacts,
 controlling said switching means by said logic circuit in order to generate a sequence of switching operations representing said control data, and
 detecting said sequence of switching operations by said device by means of said external contacts.

It should be noted that preferred embodiments as well as advantages mentioned with respect to the inventive integrated circuit are also applicable to the inventive device and the inventive methods.

BRIEF DESCRIPTION OF THE DRAWINGS

In the following, the invention will be explained further in detail by way of exemplary embodiments with reference to the Figures, in which.

DESCRIPTION OF EMBODIMENTS

Figure 1:
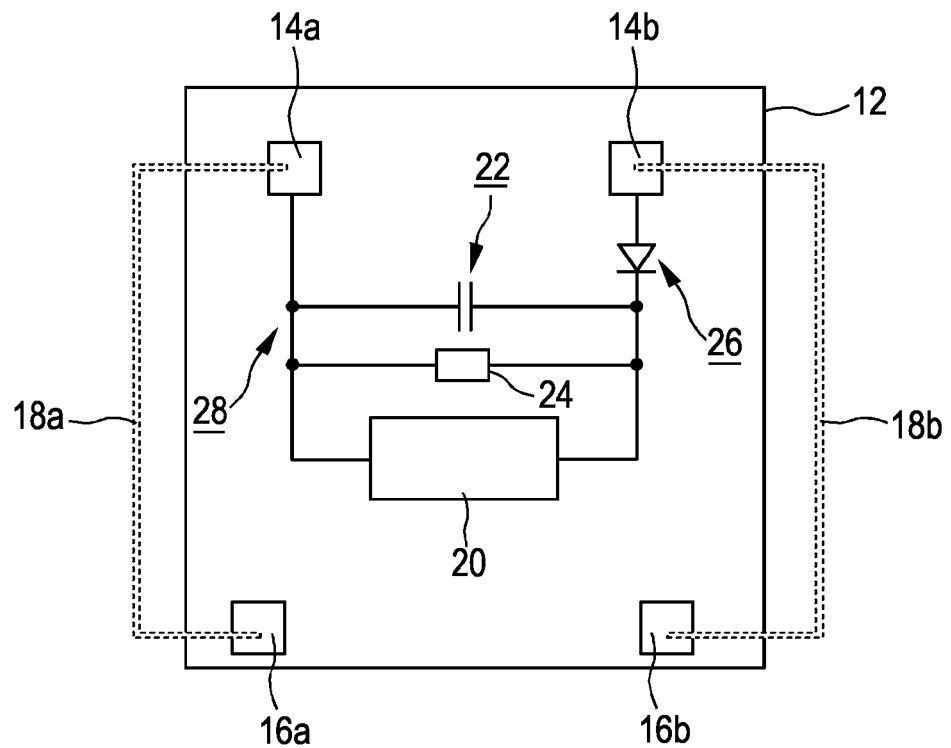
FIG. 1 shows a basic circuitry of a known integrated circuit.

FIG. 1 shows a basic circuitry of a known integrated circuit 12 comprising antenna contact pads 14a, 14b for connecting an external antenna to said integrated circuit 12 to form an RF transponder. Said integrated circuit 12 further includes test contact pads 16a, 16b for providing a functionality for testing said integrated circuit 12. Said integrated circuit 12 is manufactured together with other integrated circuits (not shown) on a wafer (not shown). On the wafer a number of integrated circuits are arranged, while between the integrated circuits some space is left unoccupied. For separation of the integrated circuits the wafer is cut after forming the integrated circuits on the wafer and after testing of the integrated circuits. For the purpose of testing and to provide the integrated circuit 12 with power during testing, the test contact pads 16a, 16b are electrically connected to the antenna contact pads 14a, 14b via contact lines 18a, 18b, respectively, which are arranged on the wafer mostly outside the area of the integrated circuit 12. During the cutting of the wafer, i.e. the separation of the integrated circuits, said contact lines 18a, 18b are interrupted, leaving the test contact pads 16a, 16b without further use. Said integrated circuit 12 further comprises a logic circuit 20 which is electrically connected to the antenna contact pads 14a, 14b. A capacitor 22 and a resistor 24 are arranged in parallel with the logic circuit 20. Further, a rectifier 26 is provided in the connection between the logic circuit 20 and antenna contact pad 14b. Rectifier 26, resistor 24 and capacitor 22 form a rectifying circuit 28 for rectifying the electromagnetic signals received by an antenna (not shown) in order to provide a DC voltage for the operation of the integrated circuit 12. The resistor 24 may be replaced by a transistor, and the rectifying circuit 28 may be replaced by some different means for providing a power supply for the integrated circuit 12. This also applies to the embodiments according to the present invention described below.

Figure 2:
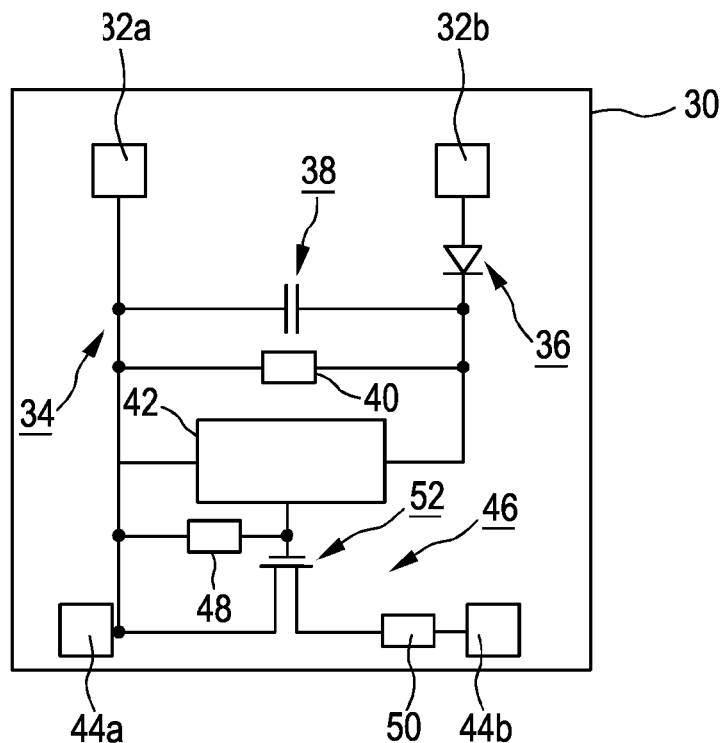
FIG. 2 shows a basic circuitry of a first embodiment of an integrated circuit according to the present invention.

FIG. 2 shows a basic circuitry of a first embodiment of an integrated circuit 30 according to the present invention. Said integrated circuit 30 comprises two antenna pads 32a, 32b, a rectifying circuit 34 including a rectifier 36, a capacitor 38, and a resistor 40 (or transistor) and a logic circuit 42 which is connected to said antenna pads 32a, 32b via said rectifying circuit 34 in a manner similar to the known integrated circuit 12 shown in FIG. 1. Further, said integrated circuit 30 is provided with two external contacts 44a, 44b which are connected to said logic circuit 42 and to one antenna pad 32a via switching means 46 comprising two resistors 48, 50 and a transistor element 52, i.e. a MOSFET. Said logic circuit 42 is coupled to the gate electrode of the transistor element 52 while the drain electrode and the source electrode are coupled to the external contacts 44a, 44b, respectively. The resistors 48, 50 are provided to prevent overloading of the transistor element 52, for example if there is a shortcut between the two external contacts 44a, 44b. By controlling said switching means 46, i.e. said transistor element 52, said logic circuit 42 controls an electrical connection between said two external contacts 44a, 44b. To provide such a switching functionality use can be made of many possible wirings known to one skilled in the art, so it will be understood that the embodiment is illustrated only by way of example in FIG. 2. Further, there are other possible ways to provide a desired switching functionality including using other kinds of transistor elements, a microelectromechanical switch and/or a piezoelectric microelectromechanical switch.

Figure 3:
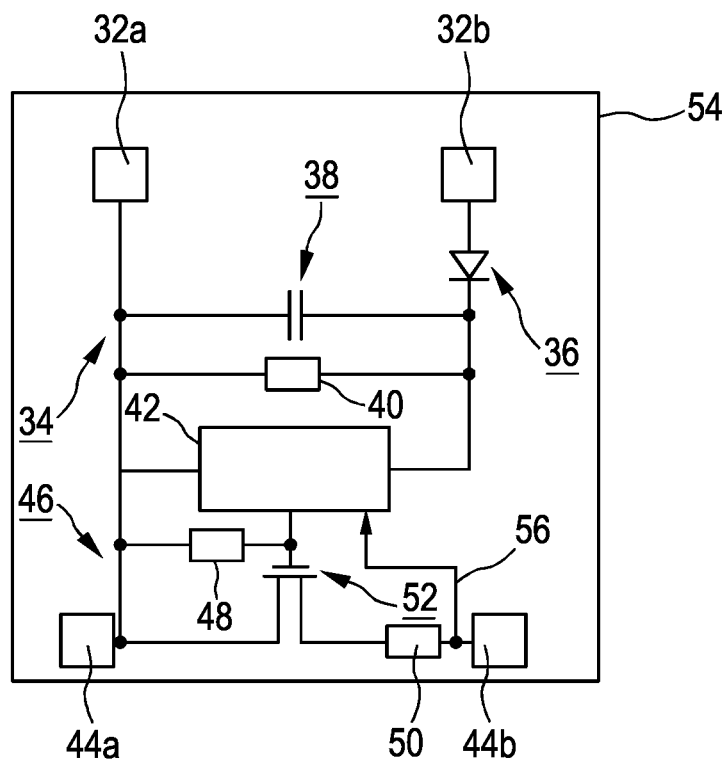
FIG. 3 shows a basic circuitry of a second embodiment of an integrated circuit according to the present invention.

FIG. 3 shows a basic circuitry of a second embodiment of an integrated circuit 54 according to the present invention. Said integrated circuit 54 of the second embodiment corresponds in many parts to the integrated circuit 30 of the first embodiment shown in FIG. 2. (Accordingly corresponding elements are denoted by the same reference numerals as used in FIG. 2.) In addition to the integrated circuit 30 of the first embodiment, said integrated circuit 54 of the second embodiment comprises an electrical coupling 56 between said external contact 44b and said logic circuit 42. Assuming the electrical connection between the external contacts 44a, 44b is closed and said external contact 44b is provided with a low signal via the transistor element 52, a high signal provided by an external element to said external contact 44b is detected by said logic circuit 42. Again, other possible ways of providing an input via said external contacts 44a, 44b and detection of said input by said logic circuit 42 are known to one skilled in the art.

In another embodiment (not shown) of the present invention, contact lines similar to the contact lines 18a, 18b of the known integrated circuit 12 shown in FIG. 1 are provided between said external contacts 44a, 44b and said antenna pads 32a, 32b for allowing a testing process of the integrated circuit 54 in a manner similar to a common testing process.

Figure 4:
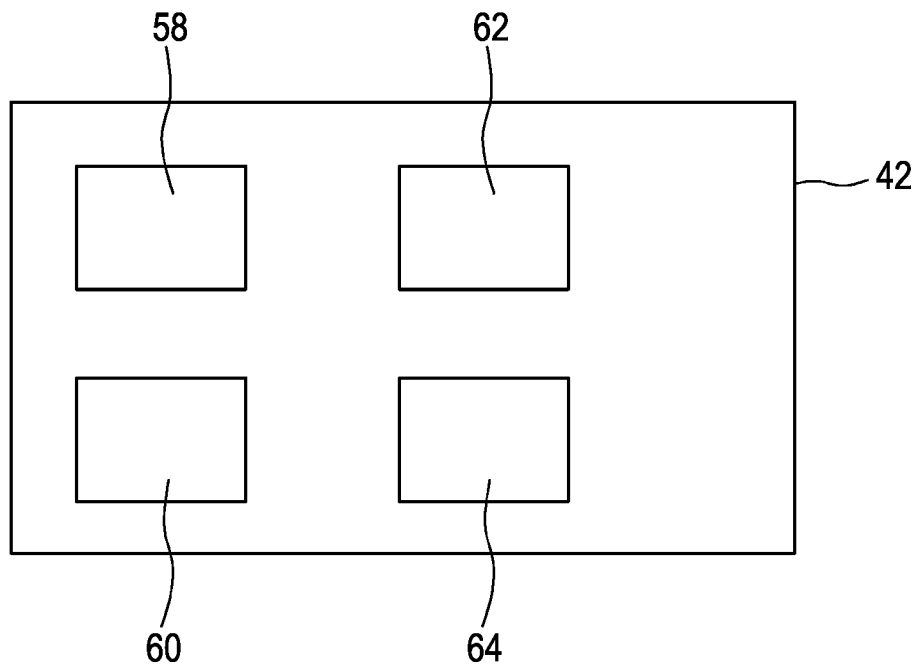
FIG. 4 shows the logic circuit according to the present invention in greater detail.

FIG. 4 shows the logic circuit 42 according to the present invention in greater detail. Said logic circuit 42 is provided with mode altering means 58 for alternating between a first mode for providing a switching functionality through said external contacts 44a, 44b and a second operation mode for performing a functionality test of the integrated circuit 30, 54 by means of said external contacts 44a, 44b. Said logic circuit 42 is further provided with identification means 60 which include an identifier. Said identifier, for example a binary number, is substantially unique and used to substantially uniquely identify said logic circuit 42 and thus said integrated circuit 30, 54. Accordingly, it is possible for the logic circuit 42 to distinguish between external signals received via said antenna pads 32a, 32b which are directed to said logic circuit 42 and/or to a group of logic circuits including said logic circuit 42 and external signals which are directed to another logic circuit or a group of logic circuits not including said logic circuit 42. Said logic circuit 42 includes coding means 62 for generating a sequence of switching commands forming a code signal and input detection means 64 for detecting an external electronic signal (e.g. binary or of special amplitude) via said electrical coupling 56.

It is possible to provide these means as separate means arranged separately in an integrated circuit 30, 54 according to the present invention. For example, if the integrated circuit 30, 54 is provided with contact lines 18a, 18b on wafer level, as shown in FIG. 1, which are cut during separation of the different dice, the mode altering means 58 may also be arranged on the waver outside of the area of the integrated circuit 30, 54 and also separated from the integrated circuit 30, 54 during the separation of the dice, since it is not necessary to change between the different operation modes of switching and testing again once the integrated circuit 30, 54 has been tested successfully.

Figure 5:
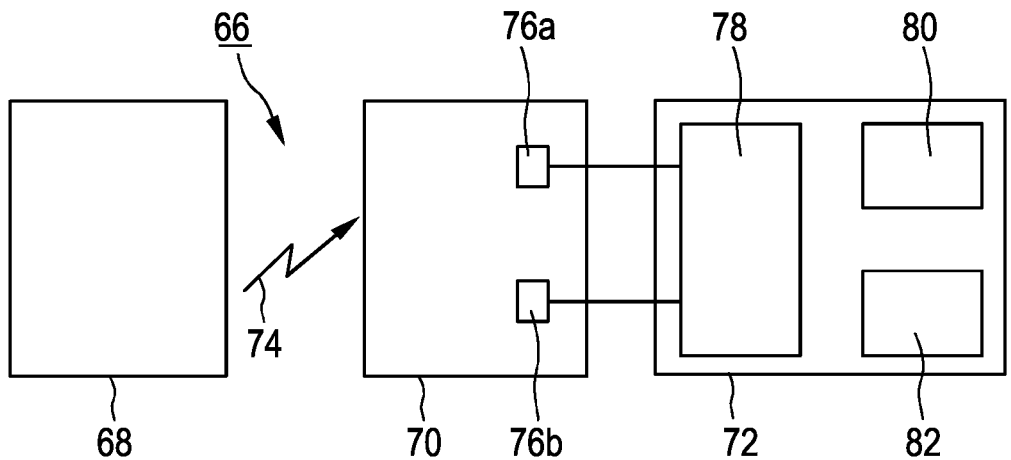
FIG. 5 shows a block diagram illustrating a system comprising a control unit, an integrated circuit and a device to be controlled according to the invention.

FIG. 5 shows a block diagram illustrating a system 66 comprising a control unit 68, an integrated circuit 70 and a device 72 to be controlled according to the invention. Said control unit 68 is provided with means for generating and transmitting control signals. Said integrated circuit 70 is adapted for receiving transmitted signals and provided with two external contacts 76a, 76b. Said device 72, which is to be controlled according to said control signals, is coupled to said external contacts 76a, 76b and provided with a function circuitry 78 to be controlled. An example of said device 72 is a TV set which may be switched on and off by means of said integrated circuit 70. The switching functionality of said integrated circuit 70 is used to implement an alternative to the common standby function of known TV sets. By switching the electrical connection between said external contacts 76a, 76b, the TV set may be switched on and off. Said device 72 further includes output detection means 80 for detecting a sequence of switching operations of the electrical connection between said external contacts 76a, 76b and signal means 82 for applying an electronic signal to said external contacts 76a, 76b.

Said control unit 68 transmits control data using—for example—electro-magnetic signals, in particular radio frequency signals 74, to said integrated circuit 70 which receives said signals 74 and processes said signals 74 to generate a sequence of switching operations of an electrical connection between two external contacts 76a, 76b of said integrated circuit 70. Said sequence of switching operations is detected by said output detection means 80 of said device 72 and said function circuitry 78 is controlled accordingly. In addition, said device 72 may apply an electronic signal to said external contacts 76a, 76b by means of said signal means 82, for example, to acknowledge a control operation of said function circuitry 78 to said integrated circuit 70.

In yet another embodiment of the invention, the device 72 also can be a single external component such as e.g. a sensor sensing one and/or more physical parameters such as e.g. the temperature and/or humidity and/or pressure etc. of the environment the sensor (and possibly also the transponder) is located in. In such a case, a DC-signal (or AC-Signal) of special amplitude, generated by the sensor device, can be detected by the transponder. This information can be sent to the reader device in order to allow the control of physical parameters.

In yet another embodiment (not shown) of the present invention, there is further provided a power element for increasing the current/voltage which is switched by the electrical connection between said external contacts 76a, 76b. The power element is controlled by the switching of said connection, and the power element itself then switches an electrical connection capable of an increased current and/or voltage.

Further, it has to be noted that, although the invention is described with two antenna contacts 32a, 32b and two external contacts 44a, 44b, 76a, 76b, the invention is not limited to this number of contacts. It is possible to provide a different number of antenna contacts 32a, 32b, including only one antenna contact for a monopole antenna and a greater number of external contacts 44a, 44b, 76a, 76b.

Figures 6, 7:
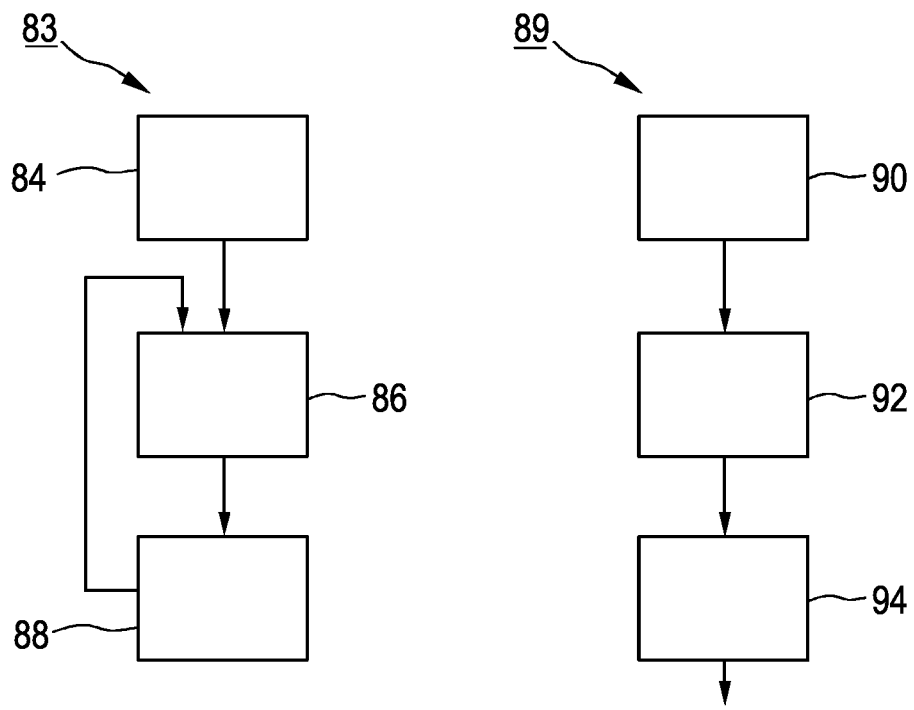
FIG. 6 shows a block diagram of a method for operating an integrated circuit according to the present invention.
FIG. 7 shows a block diagram of a method for manufacturing an integrated circuit according to the present invention.

FIG. 6 shows a block diagram of a method 83 for operating an integrated circuit 30, 54, 70 according to the present invention. In a first step 84 an integrated circuit 30, 54, 70 is provided with a first operation mode having a switching functionality in regard to an electrical connection between two external contacts 44a, 44b, 76a, 76b of said integrated circuit 30, 54, 70. Step 84 is followed by step 86 of said integrated circuit 30, 54, 70 receiving external signals. According to said external signals, switching means 46 of said integrated circuit 30, 54, 70 are controlled to perform a switching operation of said electrical connection in step 88 which may be followed by step 86 again.

FIG. 7 shows a block diagram of a method 89 for manufacturing an integrated circuit 30, 54, 70 according to the present invention comprising a logic circuit 42, at least two external contacts 44a, 44b, 76a, 76b, switching means 46 connecting said logic circuit 42 to said external contacts 44a, 44b, 76a, 76b, reception means 34 for receiving external signals and for transmitting said received external signals to said logic circuit 42 and mode altering means 58 for alternating between at least two operation modes of said integrated circuit 30, 54, 70. The method comprises the steps of producing 90 said integrated circuit 30, 54, 70 being in a second operation mode followed by testing 92 said logic circuit 42 by means of said external contacts 44a, 44b, 76a, 76b. In the case of successful testing 92 of said logic circuit 42, said integrated circuit 30, 54, 70 is changed 94 to a first operation mode for providing a switching functionality using said external contacts 44a, 44b, 76a, 76b.

Figure 8:
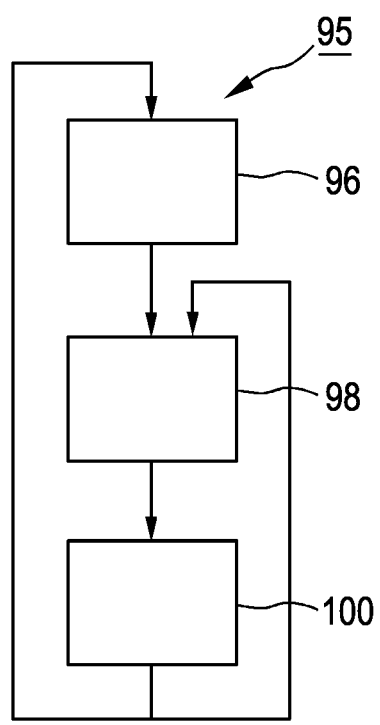
FIG. 8 shows a block diagram of a method for transmitting control data by means of an integrated circuit according to the present invention.

FIG. 8 shows a block diagram of a method 95 for transmitting control data by means of an integrated circuit 30, 54, 70 according to the present invention. Control data is transmitted in step 96 as external signals to an integrated circuit 30, 54, 70 according to the present invention, which is coupled via said external contacts 44a, 44b, 76a, 76b to a device 72 to be controlled. In a subsequent step 98, said switching means 46 are controlled by said logic circuit 42 in order to generate a sequence of switching operations representing said control data, for example, in binary or analog form. In step 100 following step 98 said sequence of switching operations is detected by said device 72 via said external contacts 44a, 44b, 76a, 76b. Step 100 may be followed by step 96 for transmitting the next control data or by step 98 for generating another sequence of switching operations.

An extended functionality of an integrated circuit 30, 54, 70, for instance being part of an RF transponder, is proposed herein. Additional external contacts 44a, 44b, 76a, 76b are used to provide a switching functionality, so that the integrated circuit 30, 54, 70 can be used to control other devices, for example, to activate and deactivate other devices. Several new applications of—for example—RF transponders are thus possible.

Finally, it should be noted that the term "comprising" does not exclude other elements or steps and the indefinite article "a" or "an" does not exclude a plurality. Also elements described in association with different embodiments may be combined. It should also be noted that reference signs in the claims should not be construed as limiting the scope of the claims.

The invention claimed is:

1. Integrated circuit comprising:
   a logic circuit;
   at least two external contacts;
   a switching circuit connecting said logic circuit to said external contacts; and
   a reception circuit configured to receive external signals and transmit said received external signals to said logic circuit,
   wherein in a first operation mode said integrated circuit is configured to provide a switching functionality through said external contacts by said switching circuit configured to switch an electrical connection between said external contacts, wherein said switching circuit is controlled by said logic circuit in response to said received external signals, and wherein said switching circuit includes a transistor, a microelectromechanical switch and/or a piezoelectric microelectromechanical switch.

2. Integrated circuit comprising:
   a logic circuit;
   at least two external contacts;
   a switching circuit connecting said logic circuit to said external contacts; and
   a reception circuit configured to receive external signals and transmit said received external signals to said logic circuit,
   wherein in a first operation mode said integrated circuit is configured to provide a switching functionality through said external contacts by said switching circuit configured to switch an electrical connection between said external contacts, wherein said switching circuit is controlled by said logic circuit in response to said received external signals, and further comprising a mode altering circuit configured to alternate between at least two operation modes of said integrated circuit, wherein a second operation mode is provided for performing a functionality test of said integrated circuit using said external contacts.

3. Integrated circuit comprising:
a logic circuit;
at least two external contacts;
a switching circuit connecting said logic circuit to said external contacts; and
a reception circuit configured to receive external signals and transmit said received external signals to said logic circuit,
wherein in a first operation mode said integrated circuit is configured to provide a switching functionality through said external contacts by said switching circuit configured to switch an electrical connection between said external contacts, wherein said switching circuit is controlled by said logic circuit in response to said received external signals, and wherein said reception circuit is configured to provide a power supply for said integrated circuit utilizing energy from said external signals.

4. Integrated circuit as claimed in claim 1, further comprising identification means including a unique identifier, being unique relative to a plurality of other integrated circuits defined according to claim 1, wherein said logic circuit controls said switching circuit in response only to received external signals which correspond to said unique identifier.

5. Integrated circuit as claimed in claim 1, wherein said reception circuit is configured to receive electromagnetic signals, in particular radio frequency signals.

6. Integrated circuit comprising:
a logic circuit;
at least two external contacts;
a switching circuit connecting said logic circuit to said external contacts; and
a reception circuit configured to receive external signals and transmit said received external signals to said logic circuit,
wherein in a first operation mode said integrated circuit is configured to provide a switching functionality through said external contacts by said switching circuit configured to switch an electrical connection between said external contacts, wherein said switching circuit is controlled by said logic circuit in response to said received external signals, and wherein said logic circuit includes a coding circuit configured to control said switching circuit for a sequence of switching operations in order to generate a code signal.

7. Integrated circuit as claimed in claim 6, wherein said generated code signal is a binary signal or an analog signal.

8. Integrated circuit comprising:
a logic circuit;
at least two external contacts;
a switching circuit connecting said logic circuit to said external contacts; and
a reception circuit configured to receive external signals and transmit said received external signals to said logic circuit,
wherein in a first operation mode said integrated circuit is configured to provide a switching functionality through said external contacts by said switching circuit configured to switch an electrical connection between said external contacts, wherein said switching circuit is controlled by said logic circuit in response to said received external signals, and wherein said logic circuit includes an input detection circuit configured to detect an external electronic signal applied to said external contacts.

9. Integrated circuit comprising:
a logic circuit;
at least two external contacts;
a switching circuit connecting said logic circuit to said external contacts; and
a reception circuit configured to receive external signals and transmit said received external signals to said logic circuit,
wherein in a first operation mode said integrated circuit is configured to provide a switching functionality through said external contacts by said switching circuit configured to switch an electrical connection between said external contacts, wherein said switching circuit is controlled by said logic circuit in response to said received external signals, and wherein said integrated circuit is part of a radio frequency identification transponder.

10. Device coupled to an integrated circuit as claimed in claim 1, the device comprising function circuitry connected to said external contacts of said integrated circuit and is controlled by said integrated circuit using said switching circuit in said first operation mode.

11. Device as claimed in claim 10, further comprising an output detection circuit configured to detect a sequence of switching operations forming a code signal.

12. Device as claimed in claim 10, further comprising a signal circuit configured to apply an electronic signal to said external contacts.

13. Method for operating an integrated circuit including a logic circuit, at least two external contacts, switching circuit connecting said logic circuit to said external contacts and reception circuit configured to receive external signals and transmit said received external signals to said logic circuit, the method comprising the steps of:
providing a first operation mode for providing a switching functionality through said external contacts by said switching circuit,
receiving said external signals and transmitting said external signals to said logic circuit by using said reception circuit, and controlling said switching circuit by said logic circuit in response to said received external signals.

14. Method for manufacturing an integrated circuit including a logic circuit, at least two external contacts, switching circuit connecting said logic circuit to said external contacts configured to receive external signals and transmit said received external signals to said logic circuit and mode altering circuit for alternating between at least two operation modes of said integrated circuit, the method comprising the steps of:
producing said integrated circuit being in a second operation mode,
testing said logic circuit via said external contacts, and
altering said integrated circuit to a first operation mode, wherein said logic circuit is configured to control said switching circuit to provide a switching functionality through said external contacts in said first operation mode of said integrated circuit in response to said received external signals.

* * * * *